Nov. 22, 1960  J. E. LUNDBERG  2,960,873
AIR-BEARING GYRO

Filed Sept. 30, 1958  3 Sheets-Sheet 1

INVENTOR.
John E. Lundberg
BY
ATTORNEYS

INVENTOR.
John E. Lundberg
BY
Arthur V. Collins
Attorney

United States Patent Office 2,960,873
Patented Nov. 22, 1960

2,960,873
AIR-BEARING GYRO

John E. Lundberg, Johnson City, N.Y., assignor, by mesne assignments, to the United States of America as represented by the Secretary of the Navy Filed Sept. 30, 1958, Ser. No. 764,464

2 Claims. (Cl. 74—5.0)

This is a continuation-in-part of co-pending application Serial Number 468,169, filed November 10, 1954, now abandoned.

This invention relates to a gyroscopic device such as would be used as navigational aid for air or water craft. A gyroscope when utilized for such a purpose may determine latitude or longitude, may function as an artificial horizon or may be used in an automatic course plotting device.

The basic element of any gyroscopic device is a rapidly spinning gyroscope which must be mounted in a universally movable support in such a manner so as to be as free as possible of all external influences. This spinning gyroscope will exhibit those qualities which are well known in the art and will yield information which may be utilized in the manner well known and common in the art to compute the desired information concerning the location, course or position of the craft.

One of the external influences which considerably lessens the accuracy of the device is friction created in the universal gimbal means mounted to the gyroscope. This friction tends to reduce the ability of the gimbal mounting to pivot freely thereby decreasing the accuracy and responsiveness of the device. To compensate for this, a very expensive complicated bearing structure may be required. Such an attempt to compensate for friction losses will add considerably to the weight of the device and in aircraft particularly this is to be avoided. Further, a conventional bearing structure no matter what its qualities are, cannot reduce the friction beyond a minimum value if it must bear the weight of the spinning mass.

There have been attempts in the pasts to mount the gyroscope so that it will spin in a fluid medium and to thereby eliminate any mechanical connection such as bearings between the spinning gyroscope and its supporting structure. However, the attempts in this direction of which applicant is aware have failed to provide a construction which will accomplish their purpose and at the same time protect the spinning mass completely and provide means to hold it in its supporting mechanism regardless of the positions the craft carrying the device may assume. This problem is of particular importance in aircraft where the craft is capable of and often goes through a wide variety of maneuvers.

Other disadvantages of the methods to spin the gyroscope in a fluid medium previously known in the art arise when a turbine driven mass is used driven by a concentrated air current which may cause undesirable precession. Where a concentrated air stream with its attendant unbalanced force is used to provide the fluid medium supporting the mass, there is no uniform and consistent load carrying characteristic present.

Additional problems prevalent in the gyroscopic navigational device are such things as: providing means to maintain a fixed relationship between the gyroscope support means and the spinning mass, providing a means for latitude correction and compass slaving, providing a means to orient the spinning mass correctly when starting and in the case of a fluid supported gyro to provide a bearing means upon which the gyro may spin if the fluid supply is cut off.

A situation peculiar to gyros in aircraft arises when the craft makes a loop or roll about one of the axes of the means journalling the gyro for its universal movement. The consequence of this movement is that the navigational information taken from the gyro for this one direction can be in error by 180°.

It is therefore the object of this invention to provide a gyroscopic device to be used for the navigation of air and water craft which is constructed in such a manner as to yield greater accuracy and responsiveness than has heretofore been known for devices of this nature.

It is an object of this invention to provide a mounting means for a gyroscope which enables the gyroscope to spin in an environment of negligible friction.

It is an object of this invention to provide a means for supporting a gyroscope for spinning in a fluid film and which will at the same time completely protect the gyroscope in all positions of the support.

It is a further object of this invention to provide a fluid film support for a spinning gyroscope which will be evenly distributed in a balanced manner over the entire surface of the gyroscope.

A still further object of this invention is to provide a means to maintain a predetermined relation between a gyroscope and its supporting structure.

Another object of this invention is to provide a means on a gyroscopic navigational aid whereby latitude correction and compass slaving may be accomplished.

Another object of this invention is to provide a means for positioning an air supported gyroscope for starting and to provide a bearing structure in case of failure of the normal air support.

Still another object of this invention is to provide a means associated with a gyroscope supporting structure and with a means receiving information from the gyroscope to automatically correct the information receiving means after it has been caused to manifest incorrect information due to an extreme maneuver on the part of the craft carrying the gyroscopic device.

Other objects and many of the attendant advantages of this invention will be readily appreciated as the same becomes better understood by reference to the following detailed description when considered in connection with the accompanying drawings wherein.

Figure 1:
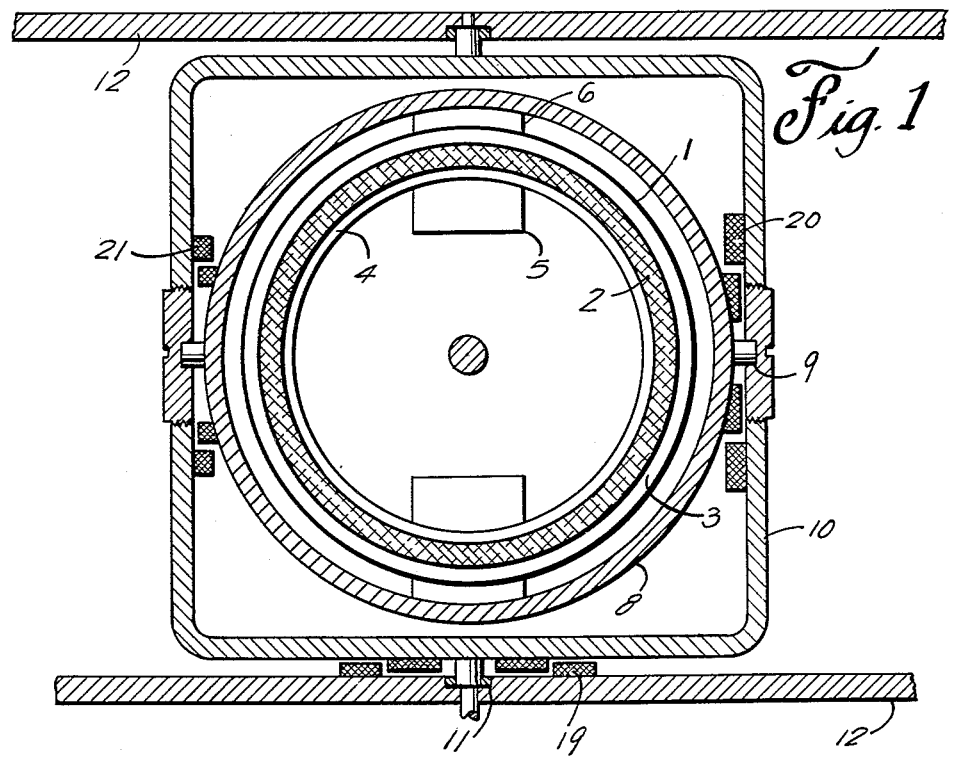
Figure 1 is a front view in section of the gyroscopic device.
Figure 2:
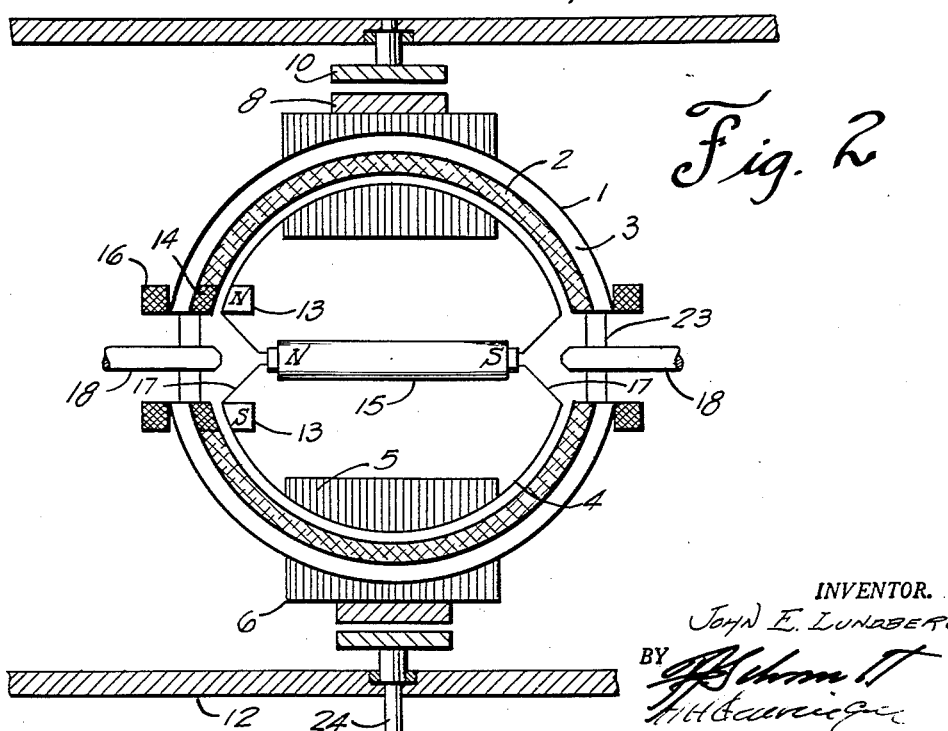
Figure 2 is a side view in section of the gyroscopic device.

Referring now to the drawings, more specifically to Figures 1 and 2, reference numeral 1 designates the casing or housing of the gyroscope rotor. In the preferred embodiment illustrated in these drawings, this housing is formed as a hollow sphere and is provided with suitable means (not illustrated) to be connected to an air or fluid supply so that air or fluid under pressure may be communicated to the interior of the sphere. Mounted in the interior of the casing is a second hollow sphere or shell 2. The sphere 2 is formed of a suitable porous material such as graphite so that the fluid under pressure entering the sphere 1 may pass therethrough. The sphere 2 is spaced from the sphere 1 so that a reservoir 3 is provided that maintains an even distribution of air around the periphery of the sphere 2. In the interior of the sphere 2, a hollow rotor 4 is placed. This rotor is not structurally connected to any portion of the sphere 2 but rather is supported for rotation by the cushion of air emanating from the interior surface of the sphere. Thus there is provided a means for mounting the rotor of a gyroscope which utilizes no mechanical bearing structure with its disadvantages of either high friction losses or considerable weight and expense. Further, this means of mounting the rotor assures an even distribution of the air cushion so unbalancing forces due to directed air streams are not present thereby resulting in a more stable and accurate instrument. Further the spinning mass is completely encompassed in a housing and is thereby protected in all positions.

Motive force is provided to rotate the rotor by means of a laminated magnetic stack 5 mounted by suitable means on the interior of the rotor. The stack reacts with a rotating electric field in the stator 6 which is fixed on the outer periphery of the casing 1. The direction of the rotation induced by these coacting elements is about an axis normal to the plane of Figure 1 and passing through the center of the rotor.

The casing 1 is mounted in an inner gimbal ring 8 which ring in turn is mounted for swinging movement by means of bearings 9 in an outer gimbal ring 10. The gimbal 10 is mounted for swinging movement by means of the bearings 11 on a frame or support 12. This supporting means for the gyroscope permits a universal movement and a free suspension so that complete independence of the carrying craft is accomplished.

Fixed on the interior of the rotor is a magnet 13 having its north and south poles placed as shown in Figure 2. A differentially wound coil 14 is provided on the porous casing or housing 2 and if the rotor 4 should become angularly displaced from the gimbal mounting means, a signal is produced and fed through suitable phase sensitive amplifiers to actuate the servo motors 19 and 20 mounted on the gimbals 10 and 8 respectively so that the gimbals will be aligned with the new positions of the rotor.

A detector 21 associated with gimbal 8 and a similar detector (not shown) associated with gimbal 10 function as synchro transmitters for transmitting intelligence to external equipment. Balancing networks in the closed loop servo mechanism correctly position the spin axis normal to the trunnion axis 9 function to oppose the signal produced by the magnet 13 and coil 14 so that hunting or oscillation of the gimbal is prevented.

A bar magnet 15 is mounted in the interior of the rotor so that its longitudinal axis is aligned coaxially with the axis of the rotor. The reaction of this magnet with the motor coils 16 controlled by a suitable means (not shown) is used to produce precession for compass control and/or latitude compensation or slaving to an acceleration sensitive element.

There is also provided a means to properly align the rotor when starting up the gyroscope which same means can be used to provide a bearing means to support the rotor for rotation in the event the air supply directed to the interior of the casing 1 should fail. The casings 1 and 2 are each provided with an aperture on diametrically opposite ends. The center lines of these apertures are coincident with the axis of rotation of the rotor. A frustro-conical depression 17 is provided on each end of the rotor 4, the center of which confronts the center of the apertures in the casings 1 and 2. Slidably mounted in annular sealing elements 23 in each aperture are elongated rod elements 18. These rod elments may be manually slid to engage the centers of the depressions 17 to properly position the rotor when the gyroscope is being started up or in the event that the air supply should fail they may be maintained in engagement with the centers of the depressions to afford a bearing means upon which the sphere 4 may rotate.

The information received from the relative positions of the gimbal mounting the gyroscope is transmitted to a suitable means to be translated into information which will aid the user in the navigation of the craft in which the gyroscope is mounted. Some of this information is transmitted by means of a shaft 24 fixed to the gimbal 10. In the normal use of this device, the axis of spin will be horizontal and the gimbals 8 and 10 are kept aligned with their original orientation with respect to the axis of spin by the servo system described above. Thus, the outer gimbal 10 will furnish information of the position of the craft in azimuth.

In a device of this kind, the gyro element, which is the spinning sphere, is substantially suspended freely in space and the enclosing chamber is essentially slaved to it so that the positions of the enclosing chamber, in azimuth, is the same as that of the sphere. Thus, when this device is mounted in an aircraft which executes a loop or roll about an axis which is coincident with an axis passing through bearings 9, gimbal 8 will turn without effecting the azimuth axis. Hence, after making such a maneuver, the indicated heading can be in error by 180°. In order to eliminate this, a means is provided to produce a signal when the gimbal 8 passes through a 90° position in relation to gimbal 10. This signal is used to actuate a motor means to cause any dial, transmitter or other information receiving means mounted on shaft 24 to be turned by 180°. Thus, the gyro will always give a true heading despite the type of maneuver that the craft may execute.

Figure 3:
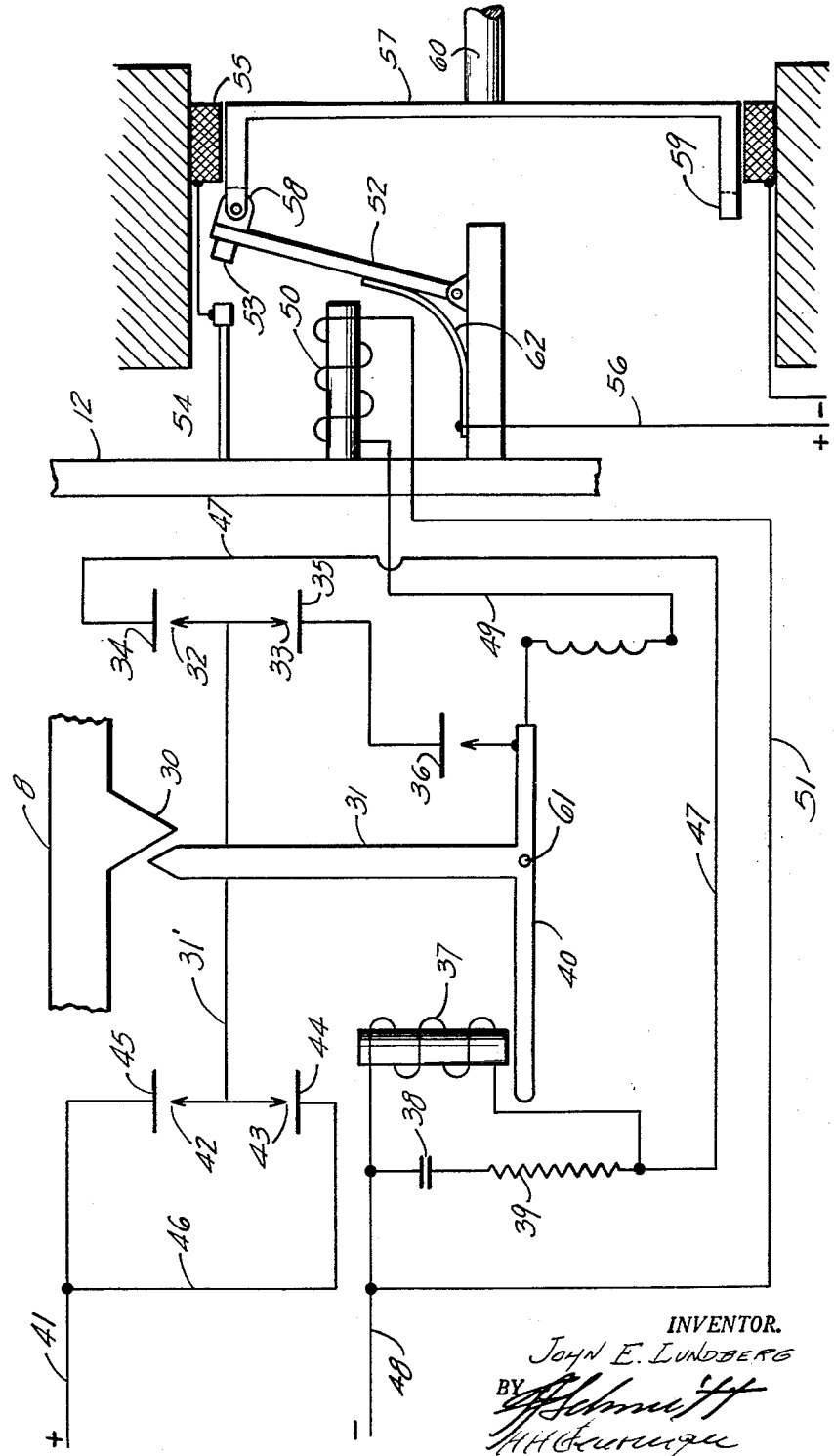
Figure 3 is a schematic drawing of the means utilized to correct the information receiving means.
Figure 4:
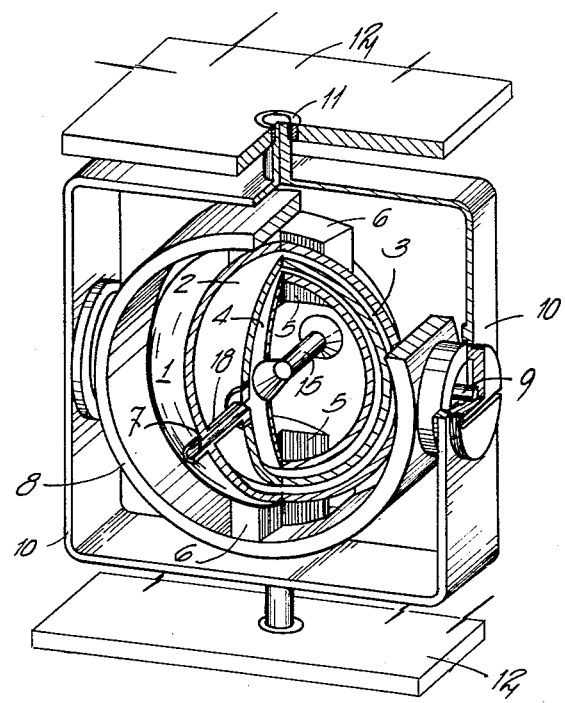
Figure 4 is a perspective view, with portions broken away, showing the device.

This correcting means is illustrated schematically in Figure 3. A projection 30 is fixed on the inner gimbal 8 and in its normal positions is displaced 90° from the switch arm 31 of a switch assembly mounted on the outer gimbal 10. This switch is of the double-pole, double-throw toggle type and has contacts 32, 33, 34, and 35 on one side of an arm carried by the arm 31 and has contacts 42, 43, 44 and 45 on an arm 31' on the other side of the arm 31 which is also an electrical conductor. The contacts 42 to 45 are connected by circuit means 41 and 46 to a source of electrical current. If desired, the contacts 42 to 45 could be eliminated and arm 31' connected directly to 41. The contacts 32 and 34 are connected to a solenoid winding 37 and a time delay circuit in parallel with the solenoid winding formed by a resistive element 39 and a capacitive element 38. The arm 31 is mounted on a lever 40 which is pivoted to a support as at 61 and carries a contact means which is adapted to engage contact 36 connected by circuit means to contact 35. The contact on the lever 40 is connected by circuit means 49 to a solenoid winding 50 on the frame 12. The circuit for the solenoids 37 and 50 is completed by circuit means 47 and 59 and 51 respectively.

The solenoid 50 when activated will pull arm 52 over to cause contacts 53 and 54 to be engaged. The contacts when closed will cause torque motor 55 to be activated and the correction means 57 will rotate shaft 60.

In use, the device is operated in the following manner: The gyro element namely, the rotor 4 is first positioned by means of the slidable rods 18 and a rotating electric field is applied to the coil 6. This field reacting with the laminated magnetic stack 5 will cause the rotor 4 to spin about it axis. Chamber 3 is fed by a supply of air or other gas such that a definite positive pressure is maintained therein. This gas passes through porous sphere 2 into the space between the rotor 4 and the porous sphere. This space is vented to the lower pressure outside the case through openings around pivots 18—18. The openings may also be provided by making rods 18 tubular with openings adjacent rotor 4. As a result, the gas can flow continuously into the space between the rotor and sphere. Porous shell 2 is a relatively high resistance path and will produce a pressure drop across it as a function of the amount of gas passing through it.

In the normal condition shown and with gravity being the only acceleration acting, rotor 4 will tend to fall towards the bottom of shell 2. This will reduce the gap or space thickness at the bottom and will correspondingly increase it at the top. The gas will subsequently flow freer or with less pressure drop from the top part of the space to the openings around pivots 18 than it will from the lower section. Hence, the pressure at the bottom is greater than the pressure at the top. Due to the fact that sphere 2 offers considerable resistance to the flow of gas, the pressure drop through said sphere will be greater in the top than it is in the bottom since a greater volume of gas will try to flow through the top part of said sphere. It is this pressure differential which supports rotor 4 and prevents it from contacting sphere 2. Due to the spherical nature of the construction, the rotor is thereby floated on a film of air or gas even though the device is subjected to accelerations in any direction.

In accordance with means and methods well known in the art information may be derived from the relative positions of the gyroscope supporting elements to aid in the navigation of the craft.

In the event that this device is being utilized in an aircraft and the craft makes a loop or a roll about the axis of the bearings supporting the gimbal 8, the information being transmitted by the shaft 24 can be incorrect by 180°. However, the correction means will respond in the following manner to restore the dial or transmitter to its proper reading:

The projection 30 on the gimbal 8 and normally spaced from the switch arm 31 by 90° will, when it has moved 89.5° to 90°, contact the arm and cause contacts 32 and 34 and 43 and 44 to close thus completing a circuit through 41, 46, 44, 43, 32, 34, 47, solenoid winding 37, delay circuit 38 and 39 and 8. If the projection 30 has moved by the point of arm 31, a finite distance, the armature of the solenoid will pull the lever 40 up breaking the contacts 43 and 44 and 32 and 34. Since the solenoid circuit has the time delay circuit therein, the contact 36 will remain closed for a small interval so that a circuit through 41, 45, 42, 33, 35, 36, 49, solenoid 50, 51, and 48 will be established. Upon being energized, the solenoid 50 will pull arm 52 about its pivot to close contacts 53 and 54 completing a circuit to the motor coil 55. The upper end of the arm 52 is provided with a projection 58 which normally rests in a notch 59 formed in a cup shaped member 57 restraining it against movement. When this projection is pulled out of the notch, the cup shaped member will be released for rotary movement. Since the solenoid 50 is activated only for a short period as determined by the time delay circuit, the arm 52 will be released from its effect but will continue to rest on the periphery of the member 57 and keep the contacts 53 and 54 closed while it is being revolved by the action of the motor coil 55. When the member 57 has revolved 180°, it will bring another notch 59 into alignment with the projection 58 and the projection and arm 52 will fall into the notch and the contacts 53 and 54 broken. A spring 62 is provided to force the arm 52 toward the member 57. The member 57 carries a shaft 60 which is connected to the remotely positioned dial, transmitting elements or other information receiving means. Thus, shaft 60 because it is rotated 180° and will correct the information receiving means to give a correct orientation despite the type of maneuver that the plane undergoes and the gyro element itself will remain fixed in space.

An alternative construction for the correction means could be obtained by substituting an electrical pickup in place of projection 30 and arm 31 and utilizing an electronic circuit to actuate the motor element 57.

Obviously many modifications and variations of the present invention are possible in the light of the above teachings. It is therefore to be understood that within the scope of the appended claims the invention may be practiced otherwise than as specifically described.

What is claimed is:

1. A gyroscopic device comprising a frame, a first gimbal journalled in said frame, a second gimbal journalled in said first gimbal, an outer casing secured in said second gimbal, a porous casing secured within said outer casing, a substantially spherical hollow rotor disposed within said porous casing, said rotor having depressions at each end of its axes of rotation and said casings having apertures aligned therewith, rigid elongated elements mounted in said apertures and axially moveable therein for engagement with said rotor at said depressions whereby said rotor may be positioned and supported for rotation thereon, means for introducing and venting a continuous supply of gas under pressure to the interior of said outer casing that is capable of passing through said porous casing and forming a fluid film for supporting said rotor, a magnetic stack secured within said rotor, a driving stator mounted on said outer casing for receiving a rotating field to cause rotation of said rotor about an axis of rotation, a magnet mounted within said rotor having an axis perpendicular to the axis of rotation of said rotor, differential coils secured on said outer casing, said magnet reacting with said coils when said rotor is angularly displaced from its axis to produce an electrical signal, servo motors on said gimbals and frame, means whereby said signals will cause actuation of said servo motors to provide a force to maintain the original alignment of said gimbals and the axis of said rotor.

2. The device of claim 1 including a projecting cam on said second gimbal, a plunger operated, double-pole, double throw toggle switch, a plunger in said toggle switch arranged to be moved by said cam upon rotation of said second gimbal through 90° so as to place said toggle switch in a first position, a source of current, a first solenoid including a coil and an armature, said armature being connected to said plunger for movement therewith upon energization of said coil and thereby shifting said toggle switch to a second position, said first solenoid coil being in circuit with said source of current through said toggle switch when in said first position for energization of said coil, a normally open second switch connected for closing with energization of said first solenoid, a time delay circuit in parallel with said first solenoid coil for maintaining energization thereof for a time after said toggle switch is shifted from said first position, a second solenoid having a coil and a pivoted armature associated therewith, a motor having an armature adapted for connection to information receiving means and normally being locked against rotation by said pivoted armature, the coil of said second solenoid being in circuit with said source of current through said second switch and said toggle switch upon energization of said first solenoid and shifting of said toggle switch to said second position, and a normally open third switch in circuit with said motor, said latter switch being closed and motor armature being unlocked with movement of said pivoted armature upon energization of said second solenoid for a time determined by said delay circuit sufficient to permit rotation of said motor armature through 180°.

References Cited in the file of this patent
UNITED STATES PATENTS

| | | |
|---|---|---|
| 1,986,807 | Gillmor | Jan. 8, 1935 |
| 2,785,573 | Bently | Mar. 19, 1957 |
| 2,871,706 | Fischer et al. | Feb. 3, 1959 |